US 7,164,886 B2

(12) United States Patent
Mowery et al.

(10) Patent No.: US 7,164,886 B2
(45) Date of Patent: Jan. 16, 2007

(54) BLUETOOTH TRANSPARENT BRIDGE

(75) Inventors: Keith R. Mowery, Plano, TX (US); William F. Harris, Dallas, TX (US); Daniel G. Jensen, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 435 days.

(21) Appl. No.: 10/266,873

(22) Filed: Oct. 8, 2002

(65) Prior Publication Data
US 2003/0083013 A1 May 1, 2003

Related U.S. Application Data

(60) Provisional application No. 60/335,693, filed on Oct. 30, 2001.

(51) Int. Cl.
*H04B 7/00* (2006.01)
(52) U.S. Cl. .................. 455/41.2; 455/557; 455/414.1; 455/575.7; 343/702; 343/906; 342/51; 342/42; 342/60
(58) Field of Classification Search ............... 455/41.2, 455/557, 414.1, 575.7; 343/702, 906
See application file for complete search history.

(56) References Cited
U.S. PATENT DOCUMENTS 6,255,800 B1 * 7/2001 Bork ........................ 320/115
6,430,395 B1 * 8/2002 Arazi et al. ................ 455/41.2
6,452,910 B1 * 9/2002 Vij et al. .................... 370/310
6,622,018 B1 * 9/2003 Erekson .................... 455/420
6,680,923 B1 * 1/2004 Leon ......................... 370/328
6,744,753 B1 * 6/2004 Heinonen et al. .......... 370/338
6,771,933 B1 * 8/2004 Eng et al. .................. 455/41.2
6,775,258 B1 * 8/2004 van Valkenburg et al. .. 370/338
6,816,925 B1 * 11/2004 Watts, Jr. .................... 710/36
6,823,186 B1 * 11/2004 Salokannel et al. ...... 455/452.1
6,834,192 B1 * 12/2004 Watanabe et al. .......... 455/444
6,842,611 B1 * 1/2005 Beck et al. ............... 455/414.1
2002/0025835 A1 2/2002 Izumi
2002/0065065 A1 5/2002 Lunsford
2002/0118735 A1 8/2002 Kindred

* cited by examiner

*Primary Examiner*—Marceau Milord
(74) *Attorney, Agent, or Firm*—William B Kempler; W. James Brady; Frederick J. Telecky, Jr.

(57) ABSTRACT

System and method for transparently attaching wireless peripherals to a computer using a Bluetooth wireless network. A preferred embodiment comprises an interface (for example, interface 630), a communications bus (for example, a USB 620), and a Bluetooth wireless network adapter (for example, a master unit 610). The interface translates messages from either the communications bus or the Bluetooth wireless network adapter so that a software stack is not needed to perform the translation at a later time. This helps to maintain the computer's reliability and performance. The system and method also affords wireless connectivity without the presence of a computer system.

26 Claims, 5 Drawing Sheets

BLUETOOTH TRANSPARENT BRIDGE

CROSS-REFERENCE TO RELATED APPLICATIONS

This application claims the benefit of U.S. Provisional Application No. 60/335,693, filed on Oct. 30, 2001, entitled "Wireless PCI Single Chip Solution", which application is hereby incorporated herein by reference.

This application is related to the following co-pending and commonly assigned patent application: Ser. No. 10/266,351, filed Oct. 8, 2002 entitled Ultra-Wideband (UWB) Transparent Bridge; which is hereby incorporated herein by reference.

TECHNICAL FIELD

The present invention relates generally to a system and method for digital communications in a computer system, and more particularly to a system and method for providing unsupported wireless digital communications in a computer system without requiring the addition of support software.

BACKGROUND

Generally, one of the strongest features of a computer system is its ability to accept the attachment of additional circuits and/or devices (commonly and generically referred to as peripherals). Such ability can greatly increase the flexibility and usability of the computer system. For example, the addition of a peripheral can increase the useful lifespan of the computer system.

When a peripheral is added to a computer system, the peripheral may be attached to the computer system in one (or more) of several ways. The peripheral may attach using a wired cable, a wireless connection, or an access port. Examples of a wired cable connection may be one of a variety of communications buses, such as a parallel or serial bus, an Universal Serial Bus (USB), a Small Computer System Interface (SCSI), an IEEE 1394 bus, optical fiber, etc. Wireless connections, on the other hand, maybe radio frequency (RF), optical, microwave, or any other method that can transmit data and information without needing a physical connection. Examples of a wireless connection may be an IEEE 802.11b (Wi-Fi), IEEE 802.11a, Bluetooth, HomeRF, etc. Alternatively, access ports can be a series of connections directly on a side of the computer system that the peripheral can attach to without the use of any additional wires or wireless links. Examples of access ports can be a PCCard slot, a Peripheral Component Interconnect (PCI), Advanced Graphic Port (AGP), etc.

When the peripheral is attached to the computer system via an interface that is already supported by the computer's operating system software, then there typically is no need for additional support software to be loaded into the computer system. This is due to the fact that the support is already built into the operating system.

When the peripheral is attached to the computer system via an interface that is not already supported by the computer's operating system software, then there is a need for additional support software to be loaded into the computer system. The support software provides the needed functionality to the computer's operating system software to provide support for the interface that is used to attach the peripheral. For example, if a wireless keyboard is designed to attach to the computer system wirelessly using a Bluetooth wireless connection, then, unless the computer's system has built-in support for Bluetooth wireless networks, support software must be loaded in order for the computer system's operating system to recognize the presence of the Bluetooth wireless network and the wireless keyboard.

One disadvantage of having to load additional support software into the computer system's operating system is that the addition of any software will inherently make the computer system more unstable. It is highly unlikely that the addition of a program will make the operation of a computer system more reliable.

A second disadvantage of the adding additional support software for each unsupported interface used in the computer system is that the computer system's operating system will continues to grow larger and larger, with each additional support program. As the operating system grows in size, the performance of the computer system will typically suffer. Also, the hardware infrastructure requirements of the operating system will increase, requiring a faster processor or more memory.

SUMMARY OF THE INVENTION

These and other problems are generally solved or circumvented, and technical advantages are generally achieved, by preferred embodiments of the present invention which provides for the attachment of peripherals to a computer system using an attachment technology that is not already supported by the computer system's operating system without needing to add necessary support software. Preferred embodiments of the present invention negate the need for support software by providing a self-contained interface between the peripheral and its attachment technology and the computer system. The self-contained interface then provides a translation between signals generated by the unsupported attachment technology and a supported attachment method.

In accordance with a preferred embodiment of the present invention, a method for simplifying software requirements in a computer system comprising the steps of receiving a message from a device that is attached to the computer system via a Bluetooth wireless communications link, making the received message appear to have originated from an existing communications bus in the computer system, and providing the translated message to the computer system via the existing communications bus.

In accordance with another preferred embodiment of the present invention, an interface coupled to a Bluetooth wireless device and an existing communications bus, the interface comprising a first translator coupled to the existing communications bus and the Bluetooth wireless device, the first translator containing circuitry to translate messages in a format compatible with the existing communications bus into a format compatible with the Bluetooth wireless device, a first data path coupling the existing communications bus to first translator and first translator to the Bluetooth wireless device, the first data path to carry messages from the existing communications bus to the Bluetooth wireless device, a second translator coupled to the Bluetooth wireless device and the existing communications bus, the second translator containing circuitry to translate messages in a format compatible with the Bluetooth wireless device into a format compatible with the existing communications bus, and a second data path coupling the Bluetooth wireless device to the second translator and the second translator to the existing communications bus, the second data path to carry messages from the Bluetooth wireless device to the existing communications bus In accordance with another preferred embodiment of the present invention, a computer system with a transparent Bluetooth bridge comprising a processor, a communications bus coupled to the processor, the communications bus to permit the processor to communicate to devices attached to the communications bus, an interface attached to the communications bus, the interface to translate messages passed between the communications bus and devices attached to the interface, a Bluetooth wireless network device attached to the interface, the Bluetooth wireless network device to allow other Bluetooth network devices to connect to the computer system, wherein the interface comprises a first translator coupled to the communications bus and the Bluetooth wireless device, the first translator containing circuitry to translate messages in a format compatible with the communications bus into a format compatible with the Bluetooth wireless device, a first data path coupling the communications bus to first translator and first translator to the Bluetooth wireless device, the first data path to carry messages from the communications bus to the Bluetooth wireless device, a second translator coupled to the Bluetooth wireless device and the communications bus, the second translator containing circuitry to translate messages in a format compatible with the Bluetooth wireless device into a format compatible with the communications bus, and a second data path coupling the Bluetooth wireless device to the second translator and the second translator to the communications bus, the second data path to carry messages from the Bluetooth wireless device to the communications bus.

An advantage of a preferred embodiment of the present invention is that the use of a preferred embodiment of the present invention permits the attachment of a peripheral to a computer system using an unsupported attachment technology without requiring the development and deployment of support software. This permits a more rapid dissemination of the peripheral and the attachment technology since there is no need to wait for the development and deployment of the support software.

A further advantage of a preferred embodiment of the present invention is that the use of a preferred embodiment of the present invention does not require the installation of support software into the computer system's operating system software, where the introduction of support software that is not fully debugged and tested may introduce stability and reliability issues to the overall computer system.

Yet another advantage of a preferred embodiment of the present invention is that the use of a preferred embodiment of the present invention helps to maintain existing performance levels in the computer system's operating system software by not requiring the installation of support software. This has an added benefit of reducing the need for faster processors, more memory, larger hard drives, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Bluetooth wireless connection that permits the attachment of a peripheral, for example, a wireless keyboard or mouse, to a computer system. A Bluetooth wireless connection is a medium data-rate wireless connection using time-division multiplexing to provide the functionality of a personal area network (PAN) and a wired connection replacement. Currently, a Bluetooth wireless network offers a bandwidth of approximately one MByte per second (1 MB/s), though there are extensions planned that will enable higher bandwidths. The Bluetooth wireless connection is specified in a technical standard entitled "Specification Volume 1, Specification of the Bluetooth System, Core", version 1.1, published Feb. 22, 2001. The technical specification is incorporated herein by reference. The invention may also be applied, however, to other peripherals, such as modems, network adapters, other pointing devices, speakers, mass storage devices, etc.

Figure 1A:
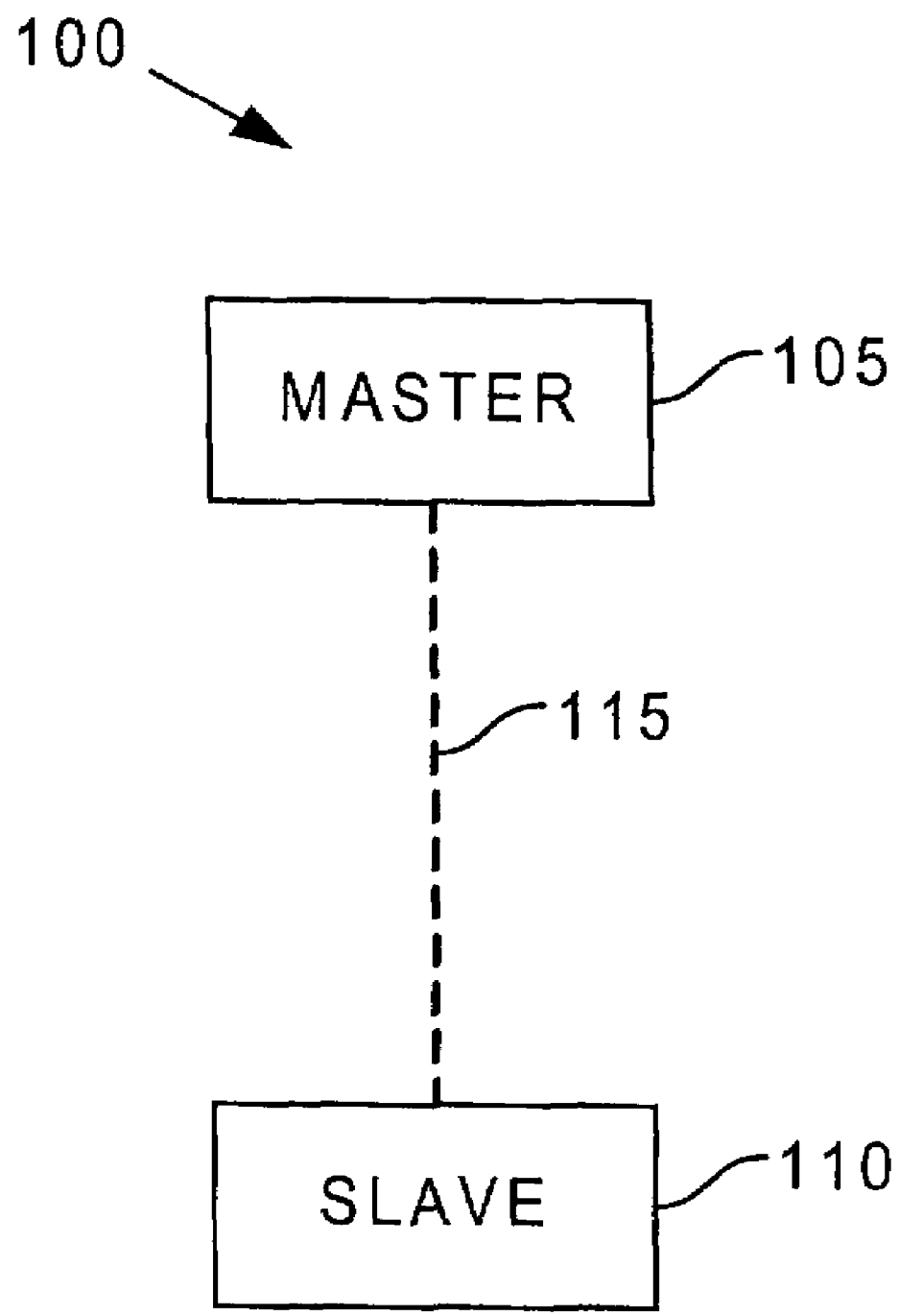
FIGS. 1a and 1b are block diagrams that illustrate two different possible configurations for a Bluetooth wireless network.

With reference now to FIG. 1a, there is shown an exemplary Bluetooth network 100 with wireless network devices. The exemplary Bluetooth network includes two network devices, a master unit 105 and a slave unit 110. In a Bluetooth network, there needs to be a single master unit (such as the master unit 105) that is responsible for controlling and scheduling the transmission of messages. Of course, in order for communications to take place, there needs to be at least one slave unit (such as the slave unit 110). The slave unit 110 cannot transmit messages on its own, it can only transmit a message that is in response to a message that it has received from the master unit 105 or it can transmit only during a time when it has been given permission to transmit. Additionally, the slave unit 110 may only transmit to the master unit 105 and not any other slave unit that may be present in the Bluetooth network 100.

Figure 1B:
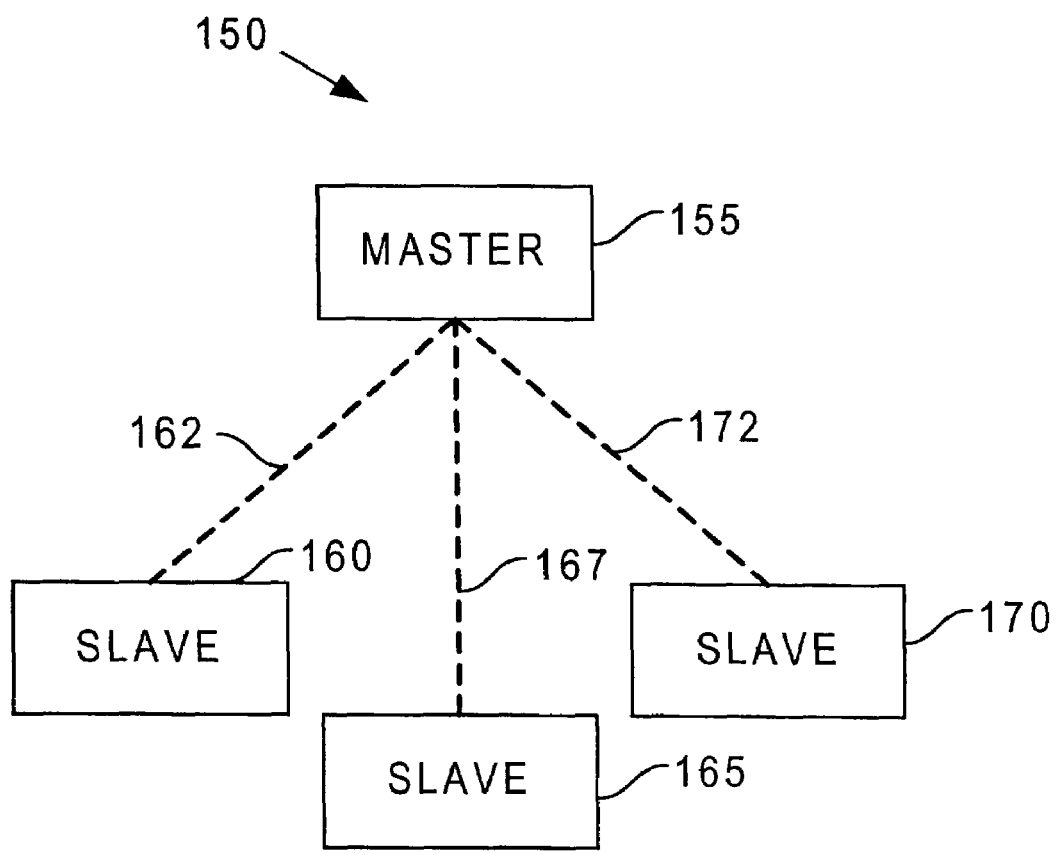

With reference now to FIG. 1b, there is shown a second exemplary Bluetooth network 150 with wireless network devices. The second exemplary Bluetooth network includes four network devices, a master unit 155 and three slave units 160, 165, and 170. As discussed above, each of the slave units may only communicate with the master unit 155 (the communications between the master unit and the slave units are illustrated as dashed lines 162, 167, and 172) and not each other. Note that FIGS. 1a and 1b illustrate Bluetooth wireless networks with a certain number of slave units (one and three respectively). This is for illustrative purposes only and the numbers of slave units illustrated are purely arbitrary.

Figure 2:
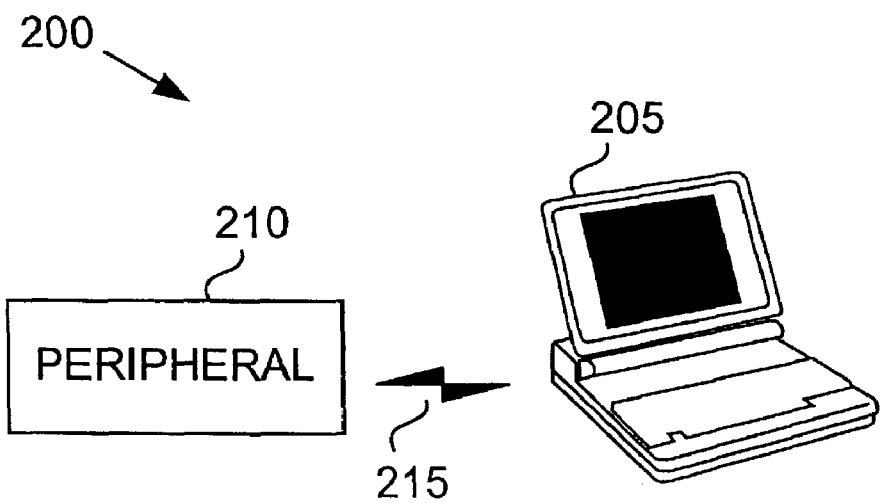
FIG. 2 is a block diagram that illustrates a computer system with a wireless peripheral attached to the computer system.

With reference now to FIG. 2, there is shown a computer system 205 with a peripheral 210 wireless attached to the computer system 205 according to a preferred embodiment of the present invention. The peripheral 210 is attached to the computer system 205 via a wireless connection 215, such as a Bluetooth wireless network connection. The wireless connection 215 effectively replaces a wired connection, permitting a great deal of flexibility when it comes to the location, movement, and placement of the peripheral 210 with respect to the computer system 205.

Figure 3:
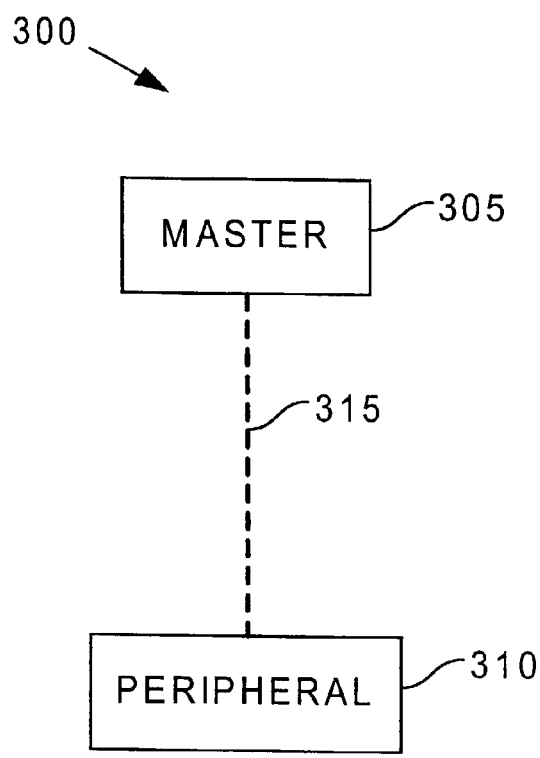
FIG. 3 is a block diagram that illustrates a wireless peripheral connected wirelessly to a Bluetooth master unit.

With reference now to FIG. 3, there is shown a Bluetooth network 200 configured in a fashion to facilitate the attachment of a peripheral 310 to a computer system according to a preferred embodiment of the present invention. To enable a maximum degree of flexibility, it is preferred that a master unit 305 of Bluetooth network 200 be located in the computer system 305. With the master unit 305 so located, any Bluetooth enabled peripheral (such as the peripheral 310) can become linked with the master unit and hence the computer system when it comes within range. If the master unit 305 is not located in the computer system, it is possible that a peripheral with a slave unit of its own will come into operating range of a computer system and the two will not be able to communicate because both are operating as slave units.

However, since in a Bluetooth wireless network, it is possible for a slave unit to become a master unit and vice versa, the case of a heretofore master unit, located in a computer system 305 may switch into a slave unit. However, to prevent the previously discussed situation where a slave peripheral comes into range of a computer system with a slave unit not being able to communicate, it is preferred that in the situation where the computer system has a slave unit, that the slave unit automatically becomes a master unit once the existing communication terminates.

Figure 4A:
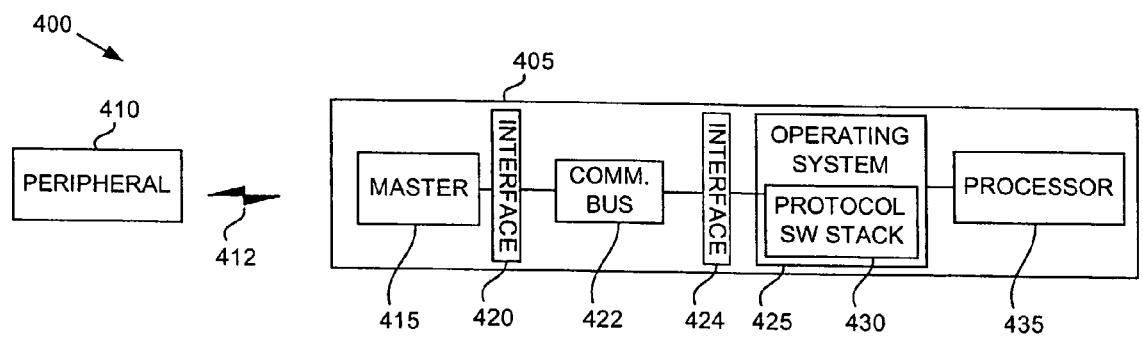
FIGS. 4a and 4b are block diagrams that illustrate functional views of a computer system with a wirelessly attached peripheral, wherein the wireless connection is made via a Bluetooth wireless link according to a preferred embodiment of the present invention.

With reference now to FIG. 4a, there is shown a functional block diagram of a computer system 405 with a peripheral 410 attached to the computer system via a wireless connection 412, preferably a Bluetooth wireless connection. As discussed earlier, the peripheral 410 will normally operate as a slave device in the Bluetooth network. FIG. 4 displays a fairly typical situation wherein the peripheral 410, such as a wireless keyboard or mouse, is connected to the computer system 405 via the wireless connection 415. As discussed earlier, other types of peripherals may also be attached to the computer system 405 in a similar fashion, examples include printers, imaging devices (scanners, still and moving image cameras, etc.), personal digital assistants (PDAs), multimedia devices (MP3 players, wireless speakers, etc.), sensors, and telemetry devices, etc.

The computer system 405 contains a Bluetooth master unit 415 that operates similarly to the master unit 305 described in FIG. 3. The purpose of the master unit 415 is to enable communications with other Bluetooth wireless network devices, contained in peripherals that are within operating range. After the master unit 415 and another Bluetooth wireless network device, for example, a Bluetooth slave device (not shown) located in the peripheral 410 establishes a wireless connection, communications from the peripheral 410 to the computer system 405 are sent through and controlled by the master unit 415.

As an example, a message sent from the peripheral 410 to the computer system 405 could take the following path: The message is generated by the peripheral 410, however, the peripheral 410 cannot transmit the message to the master unit 415 until it has been allocated a transmission slot. Once the peripheral 410 has been allocated a transmission slot and once the slot arrives, the peripheral 410 is free to transmit. The transmission is received by the master unit 415 who then delivers it to the computer system's operating system 425. However, since the master unit 415 is an unsupported communications system, it is highly unlikely that the master unit 415 can directly communicate with the operating system 425. Rather, it is likely that the master unit 415 is connected to a communications bus 422 that is in turn connected to the computer system's processor 435.

A Bluetooth wireless network communicates using messages that follow a particular format and are transmitted using a particular signaling protocol. It is unlikely that the communications bus 422 would use a compatible signaling protocol as the Bluetooth wireless network. Therefore, an interface 420 is needed to perform the translation between signaling protocol used by the Bluetooth wireless network and the signaling protocol used by the communications bus 422. After being translated by the interface 420, the message is delivered to the operating system 425. Once again, it is normal that the translated message being carried on the communications bus 422 will require another translation in order to turn it into a signaling protocol that is compatible with the signaling protocol that the operating system 425 uses. The second translation is performed by a second interface 424.

The message transmitted by the peripheral 410 has undergone two different translations to turn it into a compatible protocol required at the particular time, however, in most instances the data contained in the message itself is not transformed. For example, a Bluetooth message transmitted by the peripheral remains in the Bluetooth format. Therefore, in order for the operating system 425 to process the information contained in the Bluetooth message, a protocol software stack 430 is needed. The function of the protocol software stack is to translate the message that is encoded in the Bluetooth format into data that is understandable by the operating system 430. Typically, the protocol software stack 430 will work in both directions, e.g., translating to and from the Bluetooth format.

After being translated by the protocol software stack 430, the message is provided to the processor 435 via the operating system 425, which takes appropriate action. Messages are typically provided to the processor 435 from the operating system 425 in the form of an interrupt which causes the processor 435 to suspend what it is currently doing to read and process the message. A similar, but reversed sequence of events occurs for messages from the processor 435 destined for the peripheral 410.

In some situations, there may be several communications buses between the master unit 415 and the processor 435. For example, if the master unit 415 is connected to an Universal Serial Bus (USB), a commonly used communications bus in today's computer environment, then the USB would then be connected to the computer system's own internal bus, such as a peripheral connections interface (PCI) bus.

Figure 4B:
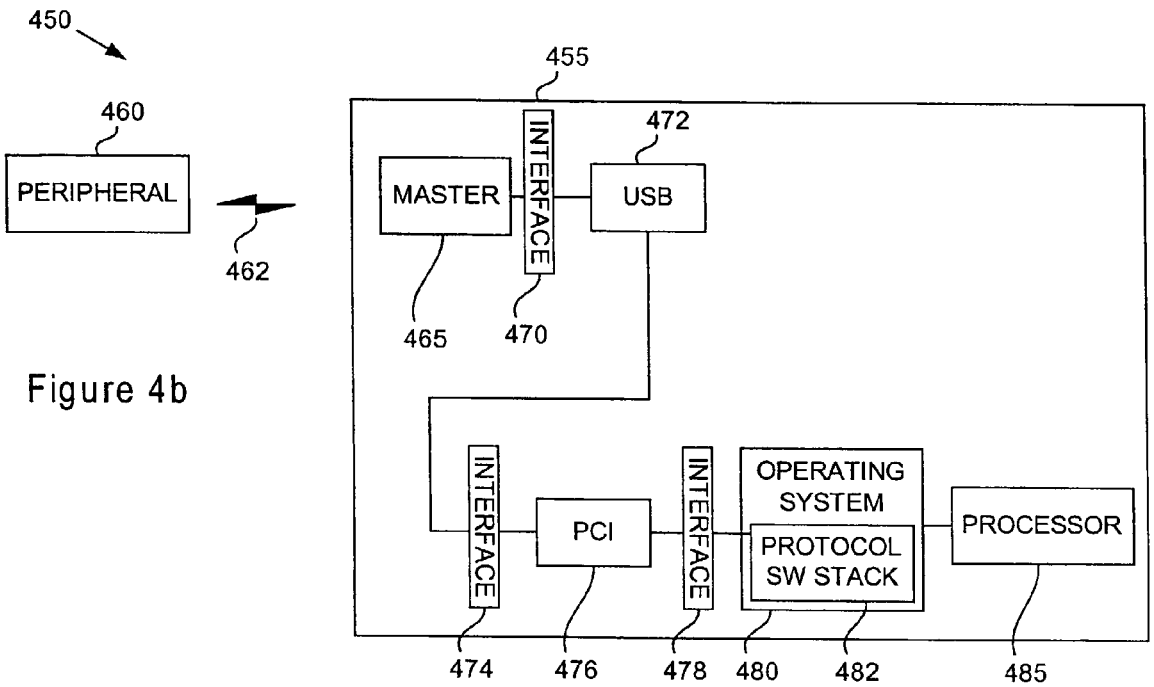

With reference now to FIG. 4b, there is shown a functional block diagram of a typical modern-day computer system 455 with a peripheral 460 attached to the computer system via a wireless connection 462, preferably a Bluetooth wireless connection. As displayed in FIG. 4b, the computer system 455 features a master unit 465 that permits Bluetooth wireless devices (and peripherals that contain them) to connect to the computer system 455. The master unit 465 is connected the computer system 455 via an Universal Serial Bus (USB) 472. The USB 472 is a communications bus that is present in a majority of computer systems built today. It permits the attachment of a wide variety of devices, including network adapters, such as the master unit 465 (which effectively serves as a Bluetooth network adapter).

The master unit 465 communicates using a Bluetooth format and signaling protocol, therefore, to make use of the USB 472, an interface 455 is required to provide a translation for the incompatible Bluetooth and USB signaling protocols. While the USB 472 is a widely available communications bus, it is not usually used to perform direct communications with a processor 485 of the computer system 455. Rather, the processor 485 normally communicates to devices and peripherals connected to it via a peripheral component interconnect (PCI) 476. The PCI 476 is a high-speed communications bus that is used by the processor 485 to communicate with peripherals and other communications buses (such as the USB 472) connected to the computer system 455. Once again, another interface is required to translate messages in the PCI format and signaling protocol into a format and signaling protocol understandable by the processor 485. A third interface 474 is needed to translate between USB and PCI formats and signaling protocol. Note that as in FIG. 4a, a protocol software stack 482, located in the computer system's operating system 480, is required to perform the translation of the actual message transmitted to (and from) the processor 485.

The use of a protocol software stack 485 is needed in order to perform the translation of the messages, since it is unlikely that the messages would be comprehensible to the receiver if they were not translated. However, if the protocol software stack 485 was not already built into the operating system 480, then it would have to be added to the operating system during the installation of the master unit 465. As discussed earlier, the introduction of additional software into an operating system can only serve to make the operating system more unstable and can decrease the performance of the computer system.

Figure 5:
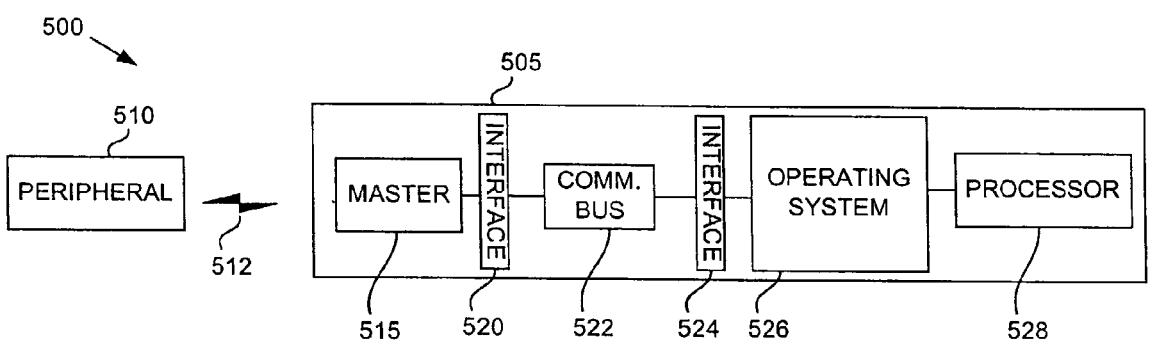
FIG. 5 is a block diagram that illustrates a functional view of a computer system with a peripheral that is wirelessly attached to the computer system via a Bluetooth wireless link according to a preferred embodiment of the present invention.

With reference now to FIG. 5, there is shown a functional block diagram of a computer system 505 with a peripheral 510 attached to the computer system 505 via a wireless link 512, preferably a Bluetooth wireless link according to a preferred embodiment of the present invention. The computer system 505 features a master unit 515 that permits the computer system 505 to connect with peripherals, such as peripheral 510, which have a built-in Bluetooth network adapter. The master unit 515 is coupled to the remainder of the computer system 505 via a communications bus 522 and an interface 520 is present to perform any necessary translations between the format and signaling protocols of the Bluetooth messages and the messages of the communications bus 522.

Up to this point, the functional block diagram illustrated in FIG. 5 is identical to the functional block diagram illustrated in FIG. 4a. However, according to a preferred embodiment of the present invention, the interface 520 not only translates any format and signaling protocol differences between the Bluetooth messages and the messages of the communications bus 522, but it also performs the translation of the Bluetooth formatted message into a format that is understandable by a processor 528 of the computer system 505. The interface 520 is preferably capable of translating messages both into and out of the format of the communications bus. For example, if the communications bus 522 is a USB, then the interface 520 can translate the Bluetooth message into a USB message and vice versa.

Since the computer system 505 already supports the communications bus 522, the computer system's operating system 526 does not require the addition of a protocol software stack (as did the computer systems illustrated in FIGS. 4a and 4b). In fact, the protocol software stack required to translate the messages from the communications bus 522 is already built into the operating system 526.

Figure 6:
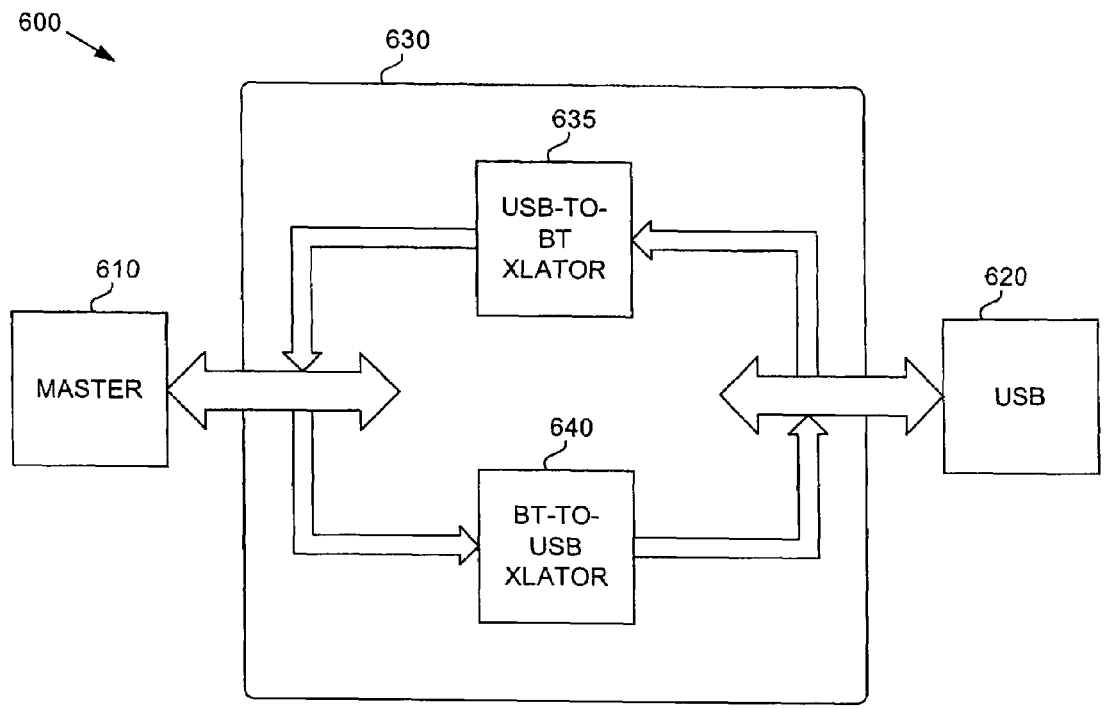
FIG. 6 is a block diagram that illustrates a Bluetooth transceiver, an USB, and an interface that translates Bluetooth messages into USB messages and vice versa according to a preferred embodiment of the present invention.

With reference now to FIG. 6, there is shown a detailed view of a portion of a Bluetooth master unit 610, a USB 620, and an interface 630 that translates Bluetooth messages into USB messages and vice versa according to a preferred embodiment of the present invention. The Bluetooth master unit 610 sends and receives messages from Bluetooth wireless devices and the USB 620 is a high-speed communications bus that permits the wired attachment of various devices to a computer system to which the USB 620 is itself attached. The interface 630 is used to translate and transform messages sent between the Bluetooth master unit 610 and the USB 620 and vice versa. The translation and transformation performed by the interface 630 allows messages originating on one side of the interface 630 (either the Bluetooth master unit 610 or the USB 620) to be carried on the other side.

A message from the Bluetooth master unit 610 destined for the computer system's processor (not shown) would pass through a lower path of the interface 630, where the message is translated and transformed from a Bluetooth format and signaling protocol into a USB format and signaling protocol by a Bluetooth-to-USB translator 640. According to a preferred embodiment of the present invention, not only does the Bluetooth-to-USB translator 640 transform the Bluetooth message into a format that is compatible with the USB 620, the actual message is translated into a USB message. Previously, the majority of interfaces simply encapsulated the messages in a compatible message format. For example, previous Bluetooth-to-USB translators will simply take the Bluetooth message and place them inside USB messages, partitioning the Bluetooth message multiple parts so that it will fit inside the USB message if needed. A message from the USB 620 to the Bluetooth master unit 610 would follow an upper path through the interface 630, where the message is translated and transformed into a Bluetooth message.

Figure 7:
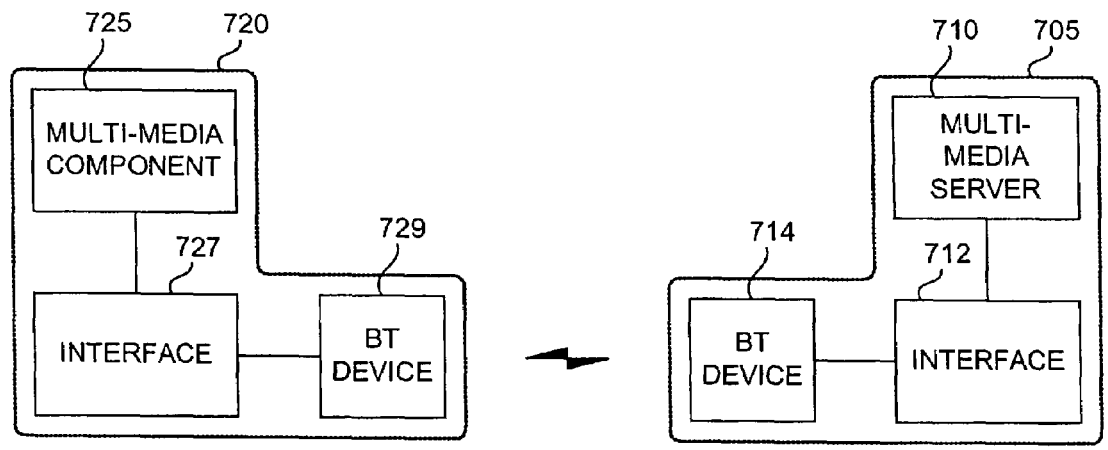
FIG. 7 is a block diagram that illustrates the use of a pair of Bluetooth wireless devices and attendant interfaces to transparently couple a multi-media server to a multi-media component device.

With reference now to FIG. 7, there is shown a block diagram illustrating the use of a pair of Bluetooth wireless devices 714 and 729 and attendant interfaces 712 and 727 to transparently couple a multi-media server 710 to a multi-media component device 725 according to a preferred embodiment of the present invention. A multi-media source 705 that may be a stand-alone device (such as a personal computer, a hard-drive based device, a compact disk player, a tape deck, a video-cassette recorder, a DVD player, a camcorder, a digital camera, etc.) or a connected device (such as a personal computer connected to a network, an AM/FM radio, etc.), whose intended purpose is to provide a stream of multi-media content, such as video, audio, and/or music, is connected to a multi-media output device 720 via a Bluetooth wireless connection. Examples of the multi-media output device 720 can include (but is not limited to) a television set, a display monitor, an audio speaker (or a set of audio speakers), etc.

Both the multi-media source 705 and the multi-media output device 720 either contain a requisite Bluetooth wireless device (for example, Bluetooth devices 714 and 729) or they may be attached to the requisite Bluetooth wireless device taking the form of a dongle. Interfaces (for example, interface 712 and 727) perform the translation of the multi-media data into Bluetooth messages and vice versa. The presence of the interfaces 712 and 727 permit the multi-media source 705 to deliver its contents to the multi-media output device 720 wirelessly, though both the multi-media source 705 and the multi-media output device 720 are ignorant of the presence of the wireless connection. To the two devices, the connection appears to be a direct wired connection.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for simplifying software requirements in a computer system comprising:
   receiving a message from a device that is attached to the computer system via a Bluetooth wireless communications link;
   translating the Bluetooth message into a format of an existing communications bus in the computer system so that the received message appears to have originated from a device utilizing the existing communications bus;
   providing the translated message to the computer system via the existing communications bus; and
   receiving a second message from the existing communications bus, the second message originating from the computer system;
   translating the second message from the format of the existing communications bus to the Bluetooth format so that the received second message appears to have originated from the Bluetooth wireless communications link; and
   providing the translated second message to the Bluetooth wireless device via the Bluetooth wireless communications link.

2. The method of claim 1, wherein the translating step comprises:
   converting the received message from a Bluetooth signaling protocol into a signaling protocol compatible with the existing communications bus; and
   reformatting the received message from a Bluetooth message format into a message format compatible with the existing communications bus.

3. The method of claim 1, wherein the receiving step is performed by a Bluetooth wireless device located in the computer system.

4. The method of claim 1, wherein the receiving step is performed by a Bluetooth wireless device located outside the computer system.

5. The method of claim 1, wherein the making step is performed by an interface located between the device and the existing communications bus.

6. The method of claim 5, wherein the interface contains two translators, a first translator translates Bluetooth messages into a format compatible with the existing communications bus and a second translator translates messages compatible with the existing communications bus into Bluetooth messages.

7. The method of claim 5, wherein the translated message has an appearance of originating from a device that is compatible with the existing communications bus.

8. The method of claim 1, wherein the second translating step comprises:
   converting the received message from a signaling protocol compatible with the existing communications bus into a Bluetooth signaling protocol; and
   reformatting the received message from a message format compatible with the existing communications bus into a Bluetooth message format.

9. The method of claim 1, wherein the existing communications bus is an Universal Serial Bus (USB).

10. An interface coupled to a Bluetooth wireless device and an existing communications bus, the interface comprising:
   a first translator coupled to the existing communications bus and the Bluetooth wireless device, the first translator containing circuitry to translate messages in a format compatible with the existing communications bus into a message on the Bluetooth wireless device;
   a first data path coupling the existing communications bus to first translator and first translator to the Bluetooth wireless device, the first data path to carry messages from the existing communications bus to the Bluetooth wireless device;
   a second translator coupled to the Bluetooth wireless device and the existing communications bus, the second translator containing circuitry to translate messages in a format compatible with the Bluetooth wireless device into a format compatible with the existing communications bus; and
   a second data path coupling the Bluetooth wireless device to the second translator and the second translator to the existing communications bus, the second data path to carry messages from the Bluetooth wireless device to the existing communications bus.

11. The interface of claim 10, wherein the first and second data paths are uni-directional.

12. The interface of claim 10, wherein the existing communications bus is an Universal Serial Bus (USB).

13. The interface of claim 10, wherein the existing communications bus is a Peripheral Component Interconnect (PCI).

14. The interface of claim 10, wherein the existing communications bus is a Peripheral Component Interconnect Express (PCI-Express).

15. The interface of claim 10, wherein the existing communications bus isan IEEE 1394 (Firewire) communications bus.

16. The interface of claim 10, wherein the existing communications bus is a Small Computer System Interface (SCSI) bus.

17. The interface of claim 10, wherein the existing communications bus is an audio data channel coupled to an audio server.

18. The interface of claim 17, wherein the audio server is an analog audio component.

19. The interface of claim 17, wherein the audio server is a digital audio component.

20. The interface of claim 10, wherein the existing communications bus is a multimedia data channel coupled to a multimedia server.

21. The interface of claim 20, wherein the multimedia server provides multimedia content in an analog format.

22. The interface of claim 20, wherein the multimedia server provides multimedia content in a digital format.

23. A computer system with a transparent Bluetooth bridge comprising: a processor;

a communications bus coupled to the processor, the communications bus to permit the processor to communicate to devices attached to the communications bus;

an interface attached to the communications bus, the interface to translate messages passed between the communications bus and devices attached to the interface;

a Bluetooth wireless network device attached to the interface, the Bluetooth wireless network device to allow other Bluetooth network devices to connect to the computer system;

wherein the interface comprises:

a first translator coupled to the communications bus and the Bluetooth wireless device, the first translator containing circuitry to translate messages in a format compatible with the communications bus into a format compatible with the Bluetooth wireless device;

a first data path coupling the communications bus to first translator and first translator to the Bluetooth wireless device, the first data path to carry messages from the communications bus to the Bluetooth wireless device;

a second translator coupled to the Bluetooth wireless device and the communications bus, the second translator containing circuitry to translate messages in a format compatible with the Bluetooth wireless device into a message on the communications bus; and a second data path coupling the Bluetooth wireless device to the second translator and the second translator to the communications bus, the second data path to carry messages from the Bluetooth wireless device to the communications bus.

24. The computer of claim 23, wherein the communications bus is a sequence of different communications buses with interfaces between each pair of communications bus.

25. The computer of claim 23, wherein the Bluetooth wireless network device is internal to the computer.

26. The computer of claim 23, wherein the Bluetooth wireless network device is external to the computer.

* * * * *